(12) United States Patent
Abdelhamid et al.

(10) Patent No.: US 11,962,249 B2
(45) Date of Patent: Apr. 16, 2024

(54) MULTI-LEVEL POWER CONVERTER ARCHITECTURE

(71) Applicant: Infineon Technologies Austria AG, Villach (AT)

(72) Inventors: Eslam Abdelhamid, Villach (AT); Juan Sanchez, Villach (AT)

(73) Assignee: Infineon Technologies Austria AG, Villach (AT)

( * ) Notice: Subject to any disclaimer, the term of this patent is extended or adjusted under 35 U.S.C. 154(b) by 27 days.

(21) Appl. No.: 17/845,879

(22) Filed: Jun. 21, 2022

(65) Prior Publication Data

US 2023/0412090 A1 Dec. 21, 2023

(51) Int. Cl.
*H02M 7/483* (2007.01)
*H02M 1/00* (2006.01)

(52) U.S. Cl.
CPC ....... *H02M 7/4837* (2021.05); *H02M 1/0025* (2021.05)

(58) Field of Classification Search
CPC .......................... H02M 1/0025; H02M 7/4837
See application file for complete search history.

(56) References Cited

U.S. PATENT DOCUMENTS

| | | | | |
|---|---|---|---|---|
| 10,686,370 | B1 * | 6/2020 | Bonnano | H02M 3/07 |
| 2019/0058397 | A1 * | 2/2019 | Lazaro | H02M 7/4837 |
| 2021/0152100 | A1 | 5/2021 | Zilio | |
| 2023/0216407 | A1 * | 7/2023 | Abdelhamid | H02M 3/071 |
| | | | | 323/263 |

FOREIGN PATENT DOCUMENTS

EP 3236576 A1 10/2017

OTHER PUBLICATIONS

European Patent Office; Extended European Search Report Corresponding to Related Application No. EP23180380; Oct. 30, 2023; 8 Pgs.
S. da Silva Carvalho, M. Halamíek, N. Vukadinović and A. Prodić, "Digital PWM for Multi-Level Flying Capacitor Converters with Improved Output Resolution and Flying Capacitor Voltage Controller Stability," 2018 IEEE 19th Workshop on Control and Modeling for Power Electronics (COMPEL), Padua, 2018, pp. 1-7.

(Continued)

*Primary Examiner* — Jue Zhang
*Assistant Examiner* — Lakaisha Jackson
(74) *Attorney, Agent, or Firm* — COOPER LEGAL GROUP, LLC

(57) ABSTRACT

According to some embodiments, an apparatus comprises a multi-level power converter configured to convert an input voltage to an output voltage, wherein the multi-level power converter comprises one or more switching groups, wherein a switching group of the one or more switching groups comprises a pair of switches and a flying capacitor, and a controller configured to determine a duty reference for the switching group, determine a duty correction factor for the switching group based upon a flying capacitor voltage error of the flying capacitor, determine a sign correction signal based on a flying capacitor ripple voltage, and determine a duty command for activating the pair of switches based on the duty reference, the duty correction factor, and the sign correction signal.

20 Claims, 8 Drawing Sheets

(56) References Cited

OTHER PUBLICATIONS

A. Stillwell, E. Candan and R. C. N. Pilawa-Podgurski, "Active Voltage Balancing in Flying Capacitor Multi-Level Converters With Valley Current Detection and Constant Effective Duty Cycle Control," in IEEE Transactions on Power Electronics, vol. 34, No. 11, pp. 11429-11441, Nov. 2019, doi: 10.1109/TPEL.2019.2899899.

S. d. Silva Carvalho, N. Vukadinović and A. Prodić, "Phase-Shift Control of Flying Capacitor Voltages in Multilevel Converters," 2020 IEEE Applied Power Electronics Conference and Exposition (APEC), New Orleans, LA, USA, 2020, pp. 299-304, doi: 10.1109/APEC39645.2020.9124402.

* cited by examiner

MULTI-LEVEL POWER CONVERTER ARCHITECTURE

TECHNICAL FIELD

The present disclosure relates to the field of regulated power conversion.

BACKGROUND

Various types of devices may utilize electric power converters that convert one form of electric energy to another, such as by changing a voltage of the electric energy. Some electric power converters are configured to regulate an output voltage and/or an output current at an output.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, an apparatus comprises a multi-level power converter configured to convert an input voltage to an output voltage, wherein the multi-level power converter comprises one or more switching groups, wherein a switching group of the one or more switching groups comprises a pair of switches and a flying capacitor, and a controller configured to determine a duty reference for the switching group, determine a duty correction factor for the switching group based upon a flying capacitor voltage error of the flying capacitor, determine a sign correction signal based on a flying capacitor ripple voltage, and determine a duty command for activating the pair of switches based on the duty reference, the duty correction factor, and the sign correction signal.

According to some embodiments, an apparatus comprises a multi-level power converter configured to convert an input voltage to an output voltage, wherein the multi-level power converter comprises one or more switching groups, wherein a switching group of the one or more switching groups comprises a pair of switches and a flying capacitor, a first controller configured to determine a duty reference for the switching group, a sign correction component configured to determine a sign correction signal based on a flying capacitor ripple voltage, one or more balancing controllers configured to determine duty correction factors for the one or more switching groups based upon a flying capacitor voltage error of the flying capacitor for the switching group, and a duty generation component configured to generate a duty commands for activating the pair of switches of the switching group based on the duty reference, the sign correction signal, and the duty correction factor.

According to some embodiments, a system comprises means for determining a duty reference for controlling a multi-level power converter configured to convert an input voltage to an output voltage using one or more switching groups, wherein a switching group of the one or more switching groups comprises a pair of switches and a flying capacitor, means for determining a duty correction factor for the switching group based upon a flying capacitor voltage error, means for determining a sign correction signal based on a flying capacitor ripple voltage, and means for determining a duty command for activating the pair of switches of the switching group based on the duty reference, the duty correction factor, and the sign correction signal.

According to some embodiments, a method comprises determining a duty reference for controlling a multi-level power converter configured to convert an input voltage to an output voltage using one or more switching groups, wherein a switching group of the one or more switching groups comprises a pair of switches and a flying capacitor, determining a duty correction factor for the switching group based upon a flying capacitor voltage error, determining a sign correction signal based on a flying capacitor ripple voltage, and determining a duty command for activating the pair of switches of the switching group based on the duty reference, the duty correction factor, and the sign correction signal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
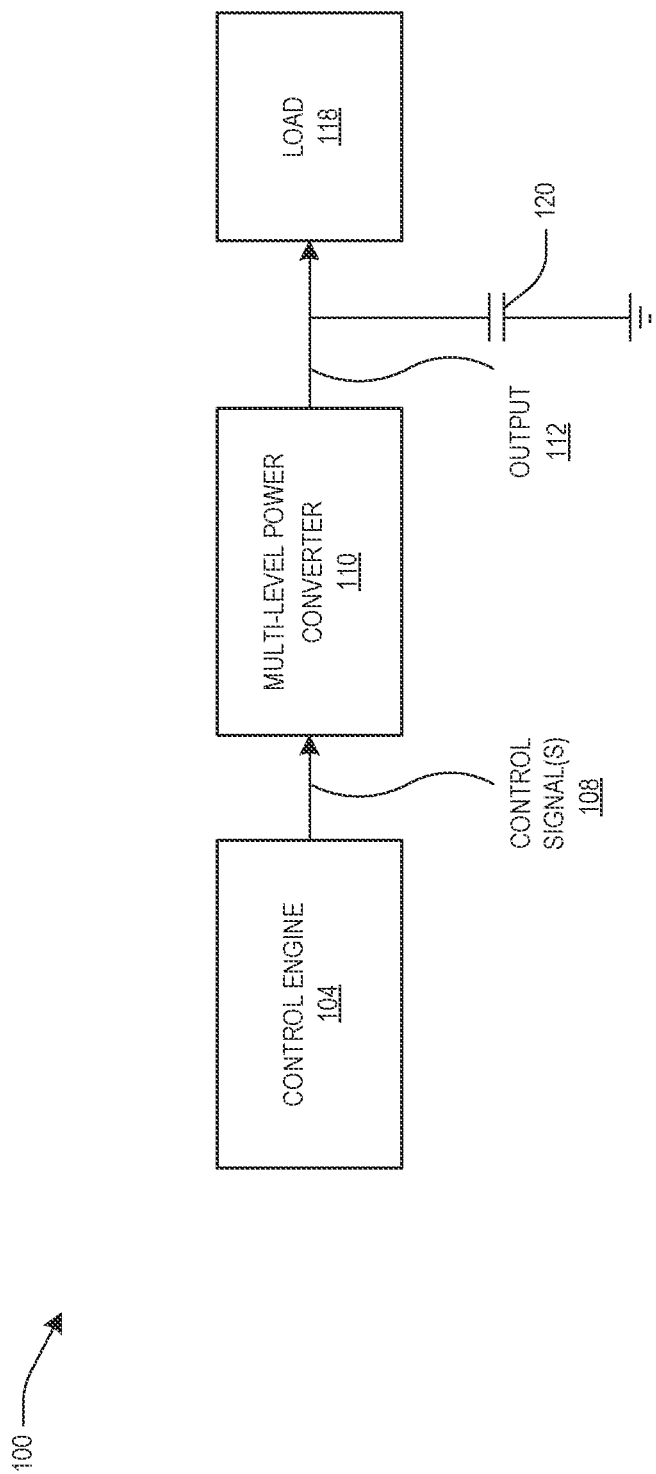
FIG. 1 a diagram of a power converter apparatus, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

The term "power converter" as used herein broadly refers to any type of power converter or voltage regulator (VR) that provides one or more regulated voltages to one or more electronic loads such as an Ethernet switch, an Ethernet router, an ASIC (application-specification integrated circuit), a memory device, a processor such as a central processing unit (CPU), a microprocessor, a graphics processing unit (GPU), a digital signal processor (DSP), an artificial intelligence (AI) accelerator, an image processor, a network or packet processor, a coprocessor, a multi-core processor, a front-end processor, a baseband processor, a field programmable gate array (FPGA), a lighting element, a power tool, a vehicle, a motor, or some other suitable load. For example, the power converter may be a buck converter, a boost converter, a buck-boost converter, a switched capacitor voltage regulator, a step-down converter, a two inductor, two capacitor (CLLC) converter, a resonant converter, etc. The power converter may be implemented as a power converter apparatus.

The term "power converter apparatus" as used herein means a functional assembly, such as a packaged functional assembly or a combination of one or more printed circuit boards and/or discrete components, that includes a regulated power converter including a switching circuit used in converting a voltage from one level to another level, e.g., as in power conversion and voltage regulation. The power converter apparatus may also include a driver circuit for driving the switching circuit. The power converter apparatus may additionally include a control engine for controlling the driver circuit so as to implement the power converter. The control engine may be configured to control the regulated power converter to reduce a voltage error of the output voltage, such as a difference between the output voltage and a target voltage, or to control a current error of the output current, such as a difference between the output current and a target current.

The regulated power converter may supply power, to a load, at an output of the regulated power converter. The control engine and/or driver functionality may instead be implemented outside the power converter apparatus. The driver circuit for the switching circuit included in the power converter apparatus also may be outside the power converter apparatus. Various passive components such as capacitors and/or inductors that make up the power converter may be included in the power converter apparatus, surface mounted to the power converter apparatus, located on a separate board, etc. Described next in more detail are various embodiments of the power converter apparatus, a method of controlling the power converter apparatus, and an electronic system that includes the power converter apparatus.

A multi-level power converter is a type of power converter that provides high efficiency and small size compared to other topologies. The multi-level power converter has N number of levels, such as 3 or more levels.

A multi-level power converter consists of 2(N−1) switches and (N−2) interconnected flying capacitors. The 2(N−1) switches are broken down into (N−1) switching groups. Each group has two switches which are driven in a complementary fashion, but each group is $$\frac{2\pi}{N-1}$$

out of phase from the previous group. For example, in a multi-level power converter having three levels, the converter has one flying capacitor $C_{fly}$ and two switching groups A and B. The switching groups are driven 180° out of phase. Switches A-A' and B-B' are complementarily driven. For an N-level converter, the most inner switching group is $B_1$ and the most outer switching group is A. The last switching group before group A is $B_{N-2}$. The voltage stress reduction and the ripple frequency increase (inductance reduction) results when voltages on the flying capacitors are balanced at $$\frac{nV_{in}}{N-1}$$

where n is me switching group index, which ranges between 1 and N−2. Any voltage mismatch results in higher voltage stress and subharmonic oscillations in the inductor current. An interleaved operation offers a degree of natural balancing for the flying capacitor (FC) voltages. However, in reality, the FC voltages are sensitive to the gate drive circuitry mismatches and circuit imperfections.

Referring to FIG. 1 a diagram of a power converter apparatus 100 is provided, in accordance with some embodiments. The power converter apparatus 100 comprises a control engine 104 and a multi-level power converter 110. The control engine 104 is configured to control the multi-level power converter using one or more control signals 108. In some embodiments, the multi-level power converter 110 controls and/or regulates an output voltage and/or an output current at an output terminal 112 of the multi-level power converter 110. The power converter apparatus 100 may comprise a voltage regulator configured to control the output voltage at the output to match a target voltage and/or the power converter apparatus 100 may be configured to reduce a voltage error of the output voltage. The voltage error may correspond to a difference between the output voltage and the target voltage. In some embodiments, the output terminal 112 is connected to a capacitor 120 for smoothing the output voltage. The output voltage may correspond to a voltage of the capacitor 120. The output terminal 112 may be connected to a load 118 to which the multi-level power converter 110 supplies power, for example.

Figure 2:
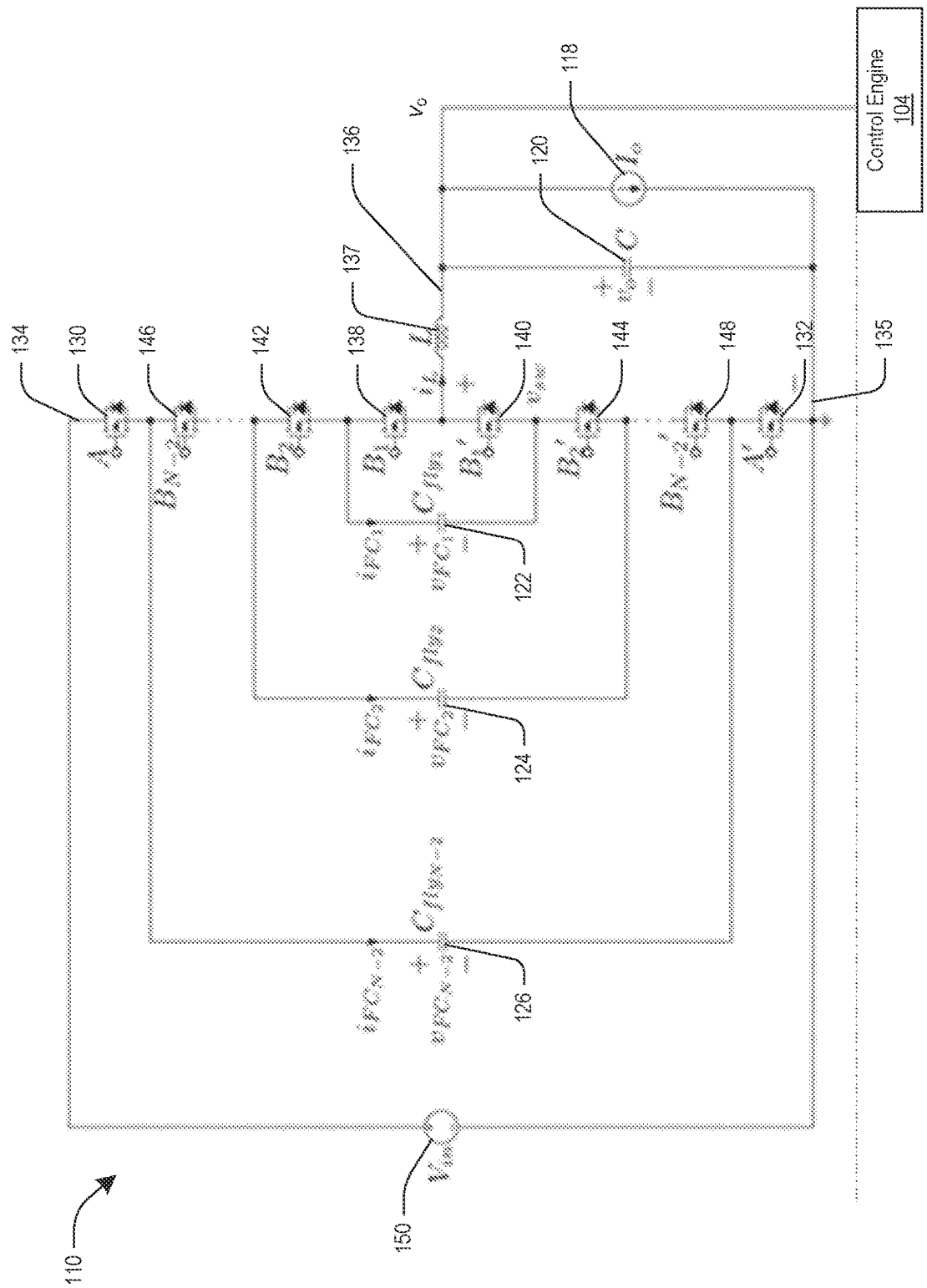
FIG. 2 is a diagram of the multi-level power converter, in accordance with some embodiments.

Referring to FIG. 2 a diagram of the multi-level power converter 110 is provided, in accordance with some embodiments. It may be appreciated that the multi-level power converter 110 may comprise any number of levels, such as 3 or more levels. The multi-level power converter 110 comprises (N−2) interconnected flying capacitors, such as a flying capacitor $C_{fly1}$ 122, a flying capacitor $C_{fly2}$ 124, and/or any other number of flying capacitors through flying capacitor $C_{flyN-2}$ 126. The multi-level power converter 110 comprises 2(N−1) switches. The 2(N−1) switches are broken down into (N−1) switching groups. A front-end switching group A-A', comprising a switch A 130 and a switch A' 132. A drain of the switch A 130 is connected to an input voltage rail 134 (such as a positive voltage input terminal) and a source of the switch A' 132 is connected to an input voltage rail 135 (such as a reference voltage or common ground input terminal). A source of the switch A 130 and a drain of the switch A' 132 are connected to the flying capacitor $C_{flyN-2}$ 126. An output voltage rail 136 is connected to the capacitor 120 and an inductor 137 for filtering the output voltage.

The other switching groups are arranged from switching group $B_1$-$B_1$' comprising switch $B_1$ 138 and switch $B_1$' 140 as an inner most switching group, to switching group $B_2$-$B_2$' comprising switch $B_2$ 142 and switch $B_2$' 144 as a next most inner switching group, and finally to switching group $B_{N-2}$–$B_{N-2}$' comprising switch $B_{N-2}$ 146 and switch $B_{N-2}$' 148 as an outer most switching group between the front-end switching group A-A' and the inner switching groups.

Each switching group comprises two switches that are driven in a complementary fashion, and each switching group is $$\frac{2\pi}{N-1}$$

out or phase from the previous switching group.

The multi-level power converter 110 comprises a first plurality of series connected switches connected between the input voltage rail 134 and the inductor 137. The first plurality of series connected switches may comprise the switch A 130, the switch $B_{N-2}$ 146, the switch $B_2$ 142, the switch $B_1$ 138, and/or any other switches between the switch $B_{N-2}$ 146 and the switch $B_2$ 142. The multi-level power converter 110 comprises a second plurality of series connected switches connected between the inductor 137 and the input voltage rail 135. The second plurality of series connected switches may comprise the switch $B_1$' 140, the switch $B_2$' 144, the switch $B_{N-2}$' 148, the switch A' 132, and/or any other switches between the switch $B_2$' 144 and the switch $B_{N-2}$' 148. Switches within the first plurality of series connected switches and switches within the second plurality of series connected switches form a plurality of switching groups, such as N−1 switching groups where N is the number of levels of the multi-level power converter 110. The multi-level power converter 110 comprises the plurality of flying capacitors connected between the plurality of switching groups. In some embodiments, the inner most switching group, comprising the switch $B_1$ 138 and the switch $B_1$' 140, are connected to the inductor 137 and the flying capacitor $C_{fly1}$ 122. In some embodiments, the flying capacitor $C_{flyN-2}$ 126 is connected between the switch A 130 and the switch $B_{N-2}$ 146 and between the switch $B_{N-2}$' 148 and the switch A' 132.

The multi-level power converter 110 is connected to the control engine 104. The control engine 104 generates control signal to operate the first plurality of series connected switches and the second plurality of series connected switches to convert the input voltage to generate the output voltage. For example, the switch $B_2$ 142 of the switching group $B_2$-$B_2$' is operated with a gate signal matching a pulse width modulation signal. The switch $B_2$' 144 of the switching group $B_2$-$B_2$' is operated with a second gate signal that is a complementary version of the first gate signal.

Figure 3:
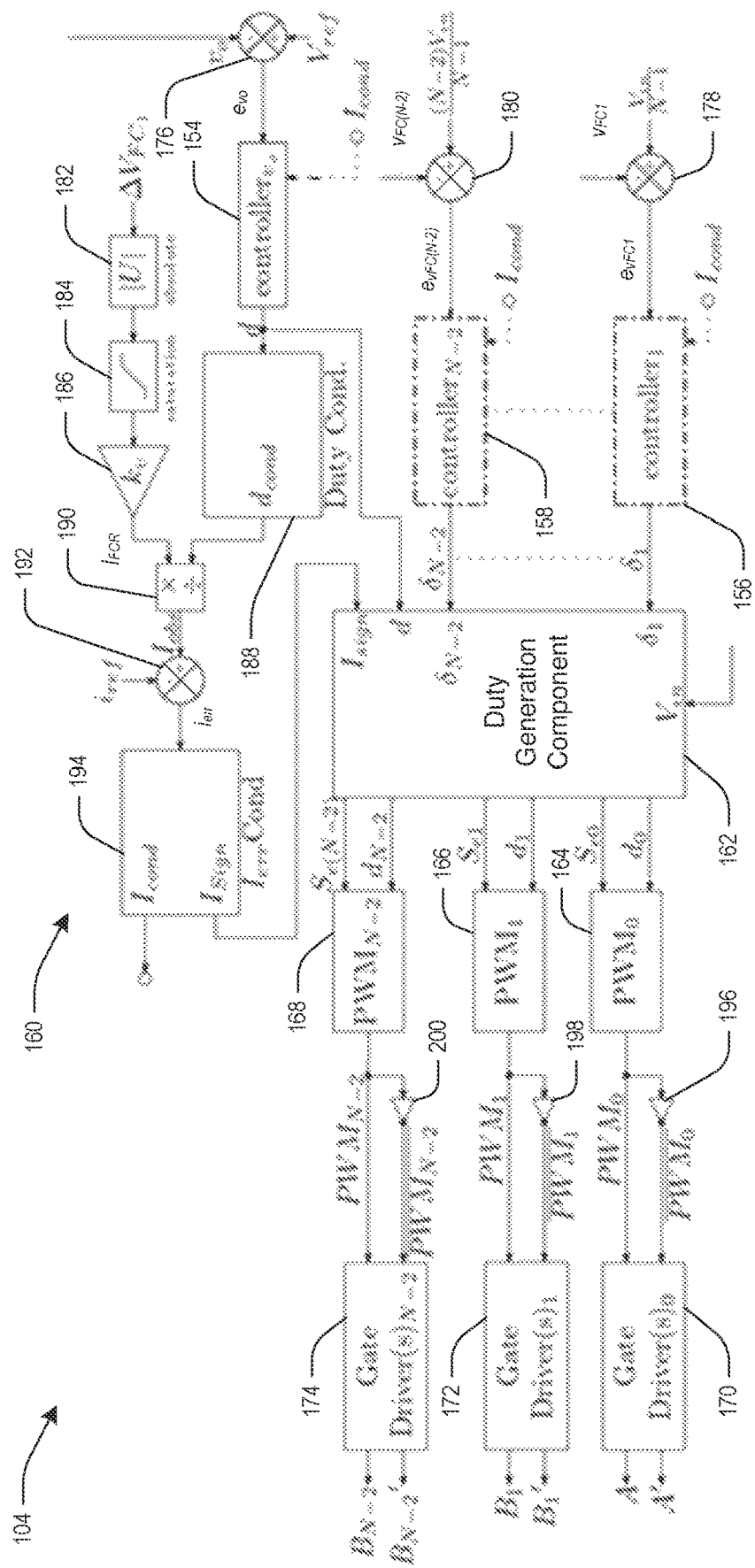
FIG. 3 is a diagram of a control engine, in accordance with some embodiments.

Referring to FIG. 3 a diagram of the control engine 104 is provided, in accordance with some embodiments. The control engine 104 may be implemented using digital circuitry, analog circuitry, or a combination of digital circuitry and analog circuitry. In some embodiments, the control engine 104 comprises a voltage controller 154, balancing controllers 156, 158, a sign correction component 160, a duty generation component 162, PWM generators 164, 166, 168, and gate drivers 170, 172, 174. There are N−2 balancing controllers, although only the first and last are illustrated in FIG. 3. Also, there are N−1 PWM generators and gate drivers. The individually numbered PWM generators 164, 166, 168, and gate drivers 170, 172, 174 are shown for illustration purposes. In a voltage mode operating scheme, the voltage controller 154 provides a duty reference, d, for controlling the multi-level power converter 110. However, in a current mode operating scheme, the output of the voltage controller 154 provides a current reference to an inner current loop, where the output of the inner loop is the duty reference, d. For ease of illustration, the block diagram of the control engine 104 shown in FIG. 3 only shows a voltage mode configuration. The techniques employed herein may be applied to a current mode controller or a voltage mode controller.

In some embodiments, a voltage error signal, $e_{vo}$, is generated by a combination module 176 based upon an output voltage feedback signal, $v_o$, and a target voltage signal, $V_{ref}$, indicative of the target voltage of the multi-level power converter 110. In some embodiments, the combination module 176 (e.g., a difference module that performs a difference function) is configured to subtract feedback signal, $v_o$, from the target voltage signal, $V_{ref}$, to generate the voltage error signal, $e_{vo}$.

In some embodiments, the voltage controller 154 receives the voltage error signal, $e_{vo}$, and generates a duty reference, d, for controlling the multi-level power converter 110. In some embodiments, the voltage controller 154 comprises a Proportional Integral Derivative (PID) controller comprising poles and/or other circuitry, or some other controller topology.

The interleaved operation of the multi-level power converter 110 results in a flying capacitor $C_{fly\_n}$ being balanced at $$\frac{nV_{in}}{N-1},$$

according to some embodiments. The balancing controller 156 receives a flying capacitor voltage error, $e_{vfc1}$, from a combination module 178 that subtracts a measured flying capacitor voltage, $v_{FC1}$, from a reference corresponding to the balanced flying capacitor voltage $$\frac{V_{in}}{N-1}.$$

In some embodiments, the balancing controller 156 generates a duty correction factor, $\delta_1$, based on the flying capacitor voltage error, $e_{vfc1}$. In some embodiments, the balancing controller 156 comprises a PID controller comprising poles and/or other circuitry, or some other controller topology.

The balancing controller 158 receives a flying capacitor voltage error, $e_{vFC(N-2)}$, from a combination module 180 that subtracts a measured flying capacitor voltage, $V_{FC(N-2)}$, from a reference corresponding to the balanced flying capacitor voltage $$\frac{(N-2)V_{in}}{N-1}.$$

In some embodiments, the balancing controller 158 generates a duty correction factor, $\delta_{N-2}$, based on the flying capacitor voltage error, $e_{vfc(N-2)}$. In some embodiments, the balancing controller 158 comprises a PID controller comprising poles and/or other circuitry, or some other controller topology. Additional balancing controllers are provided for the levels between level 1 and level N-2 to generate a duty correction factor, $\delta_n$, for each level of the multi-level power converter 110.

In some embodiments, feedback sign of the flying capacitor error signals is not sufficient to achieve negative feedback action and may depend on the load current, for example for a single-edge PWM modulation scheme. Consequently, a stability issue may be present at the balancing controllers 158 is not compensated.

In some embodiments, the sign correction component 160 addresses the stability issue by determining a sign correction signal for the duty correction factors, $\delta_n$. The sign correction component 160 uses a flying capacitor ripple voltage, $\Delta V_{FC}$, as an estimate of flying capacitor current. In one example, the ripple voltage, $\Delta V_{FC_1}$, of the flying capacitor $C_{fly1}$ 122 is used to determine the current estimate. However, the ripple voltage of a different flying capacitor may be used in some embodiments.

In some embodiments, an absolute value component 182 takes the absolute value of the flying capacitor ripple voltage, $\Delta V_{FC_1}$. A saturation component 184 receives the output of the absolute value component 182. The saturation component 184 may keep the measured value within certain limits, such as upper and lower limits, to avoid the control command from exceeding limits which may lead to instability or undesired dynamics. A gain component 186 receives the output of the saturation component 184 and generates a flying capacitor ripple current parameter, $I_{FCR}$. In some embodiments, the gain component 186 multiplies the output of the saturation component 184 by the gain factor $k_v = C_{fly} f_s$, where $C_{fly}$ is the capacitance of the flying capacitor on which the ripple voltage is measured (e.g., $C_{fly1}$) and $f_s$ is the switching frequency of the multi-level power converter 110, to generate the flying capacitor ripple current parameter, $I_{FCR}$.

In some embodiments, a duty conditioning component 188 receives the duty reference, d, from the voltage controller 154 and determines a conditioned duty reference, $d_{cond}$, that accounts for the operating mode of the multi-level power converter 110.

In some embodiments, a combination module 190 receives the conditioned duty reference, $d_{cond}$, and the flying capacitor ripple current parameter, $I_{FCR}$, and generates a flying capacitor current parameter, $I_{obs}$. In some embodiments, the combination module 190 divides the ripple current parameter, $I_{FCR}$, and the conditioned duty reference, $d_{cond}$, to generate the flying capacitor current parameter, $I_{obs}$. The flying capacitor current parameter, $I_{obs}$ provides an estimate of the inductor average current generated by the multi-level power converter 110 for powering the load 118.

In some embodiments, a combination module 192 generates a load current error signal, Ierr, based on the flying capacitor current parameter, $I_{obs}$, and a reference current parameter, $i_{ref}$. The combination module 192 may subtract the reference current parameter, $i_{ref}$, from the flying capacitor current parameter, $I_{obs}$, to generate the load current error signal, Ierr. In some embodiments, the reference current parameter, $i_{ref}$, is a constant value or any other reference signal generated from an internal or an external source. In some embodiments, the reference current parameter, $i_{ref}$, comprises a control signal.

In some embodiments, a load current error conditioning block 194 generates a sign correction signal, $I_{Sign}$, based on the load current error signal, Ierr. In some embodiments, the sign correction signal, $I_{Sign}$, comprises the sign of the load current error signal, Ierr, where the sign correction signal, $I_{Sign}$, has a value of "1" when the load current error signal, Ierr, is positive and a value of "−1" when the load current error signal, Ierr, is negative. In some embodiments, the load current error conditioning block 194 generates a conditioned current signal, $I_{cond}$, indicative of the load current. In some embodiments, the conditioned current signal, $I_{cond}$, provided as an input to the balancing controllers 156, 158 or the voltage controller 154 to allow adapting the gains of the balancing controllers 156, 158 based on the loading condition.

In some embodiments, the conditioned current signal, $I_{cond}$, is used for overcurrent protection. For example, the control engine 104 may generate an alert message, automatically adjust an operating parameter, or shut down the multi-level power converter 110 based on the conditioned current signal, $I_{cond}$, and various threshold conditions. For example, the control engine 104 may generate an alert message responsive to the conditioned current signal, $I_{cond}$, exceeding a first threshold, and shut down the multi-level power converter 110 responsive to the conditioned current signal, $I_{cond}$, exceeding a second threshold.

The duty generation component 162 receives the duty correction factors, $\delta_n$, from the N-2 balancing controllers 156, 158 and the sign correction signal, $I_{Sign}$, and generates a slope parameter, $S_c$, and a duty command, d, for each of the switching groups. In some embodiments, the slope parameter, $S_c$, defines a single edge, trailing edge, carrier signal.

In some embodiments, the duty generation component 162 multiplies the duty correction factors, $\delta_n$, by the sign correction signal, $I_{sign}$, to determine the duty commands, $d_n$, for each of the switching groups. For example, if the sign correction signal, $I_{Sign}$, has a value of "1", the duty command equals the duty reference, d, plus the duty correction factor, $\delta_n$, and if the sign correction signal, $I_{Sign}$, has a value of "−1", the duty command equals the duty reference, d, minus the duty correction factor, $\delta_n$. In some embodiments, the duty correction factor, $\delta_n$, is applied to the $n^{th}$ switching group and the $(n-1)^{th}$ switching group. For example, in a multi-level power converter 110 having three levels, the duty correction factor, $\delta_1$, is added (accounting for sign correction) to the duty reference, d, to generate the duty command, $d_1$, and subtracted from the duty reference, d, to generate the duty command, $d_0$. The duty generation component 162 may adjust the slope of the carrier signal by subtracting the correction from the original carrier slope to increase the duty cycle or by adding the correction to the original carrier slope to decrease the duty cycle.

The PWM generators 164, 166, 168 receive the slope parameter, $S_c$, and the duty command, d, for each of the switching groups and generate $PWM_n$ signals for the gate drivers 170, 172, 174. For example, the PWM generator 164 receives the slope parameter, $S_{c0}$, and the duty command, $d_0$, and generates the $PWM_0$ signal, the PWM generator 166 receives the slope parameter, $S_{c1}$, and the duty command, $d_1$, and generates the PWM, signal, and the PWM generator 168 receives the slope parameter, $S_{c(N-2)}$, and the duty command, $d_{(N-2)}$ and generates the $PWM_{N-2}$ signal. The other PWM generators of the N-1 PWM generators operate in the same way as the illustrated PWM generators 164, 166, 168. In some embodiments, the carrier signal, $C_n$, has a value that ranges from 0 to 1, and the $PWM_n$ signal comprises an "on"

pulse when the carrier signal, $C_n$, has a value less than or equal to the duty command, $d_n$, and is off when the carrier signal, $C_n$, has a value greater than the duty command, $d_n$. In some embodiments, the duty generation component modifies the slope of the carrier signal, $C_n$, based on the duty command, $d_n$, and uses a fixed threshold for generating the "on" pulse. Modifying the slope effectively reduces the maximum amplitude of the carrier signal, $C_n$. For example, reducing the slope of the carrier signal, $C_n$, increases the width of the "on" pulse and increasing the slope of the carrier signal, $C_n$, decreases the width of the "on" pulse for a fixed threshold.

In some embodiments, inverters 196, 198, 200 invert the $PWM_0$ signal, the $PWM_1$ signal, and the $PWM_{N-2}$ signal to provide complementary signals $\overline{PWM_0}$, $\overline{PWM_1}$, and $\overline{PWM_{N-2}}$ for the gate drivers 170, 172, 174, respectively. The gate drivers 170, 172, 174 generate the switching signals, A, A', $B_1$, $B_1'$, $B_{N-2}$, $B_{N-2}'$, for the switching groups, respectively.

Adjusting the sign of the duty correction factors, $\delta_n$, based on the estimated loading condition improves the stability of the power converter apparatus 100 by avoiding positive feedback states during low load conditions. Using the flying capacitor ripple voltage to estimate load current avoids the need for current sensing, which is problematic and not cost effective in high frequency power converters.

Figure 4:
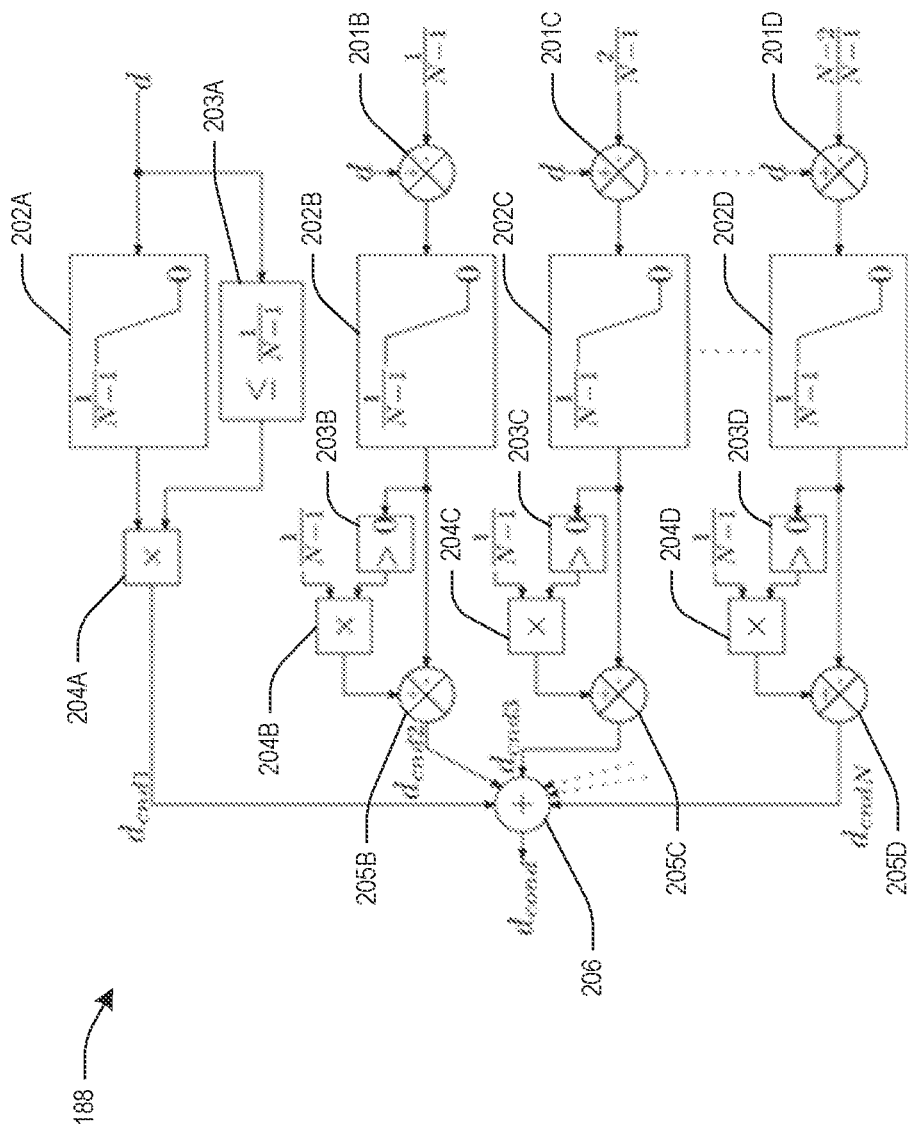
FIG. 4 is a block diagram of a duty conditioning component for a multi-level power converter, in accordance with some embodiments.

Referring to FIG. 4, a block diagram of the duty conditioning component 188 for a multi-level power converter 110 is provided, in accordance with some embodiments. The duty conditioning component 188 generates the conditioned duty cycle signal, $d_{cond}$, that reflects the operating mode of the multi-level power converter 110. An N level multi-level power converter 110 has N−1 operating modes. The value of the conditioned duty cycle signal, $d_{cond}$, for an N-level converter is a value between 0 and $$\frac{1}{N-1}$$

in all operating modes. The duty reference, d, may range from 0 to 1. The operating mode duty intervals correspond to multiples of $$\frac{1}{N-1}.$$

For example, the first operating mode has a duty interval of 0

$$0 \leq d \leq \frac{1}{N-1},$$

the second operating mode has a duty interval of $$\frac{1}{N-1} \leq d \leq \frac{2}{N-1},$$

and the last operating mode has a duty interval of $$\frac{N-2}{N-1} \leq d \leq 1.$$

If the duty reference, d, has a value in the duty interval of the first operating mode, $d_{cond}=d$. When the duty reference, d, has a value of $$\frac{1}{N-1} \leq d \leq \frac{2}{N-1}$$

in the interval of the second operating mode, the conditioned duty cycle signal is $$d_{cond} = \frac{2}{N-1} - d,$$

which results in a value of 0

$$0 \leq d_{cond} \leq \frac{1}{N-1}.$$

In the last operating mode, where the duty reference is in the duty interval $$\frac{N-2}{N-1} \leq d \leq 1,$$

the conditioned duty cycle signal is $d_{cond}=1-d$, and again, the result is a value in the range $$0 \to \frac{1}{N-1}.$$

In some embodiments, the duty conditioning component 188 comprises combination modules 201B, 201C, 201D for each operating mode other than the first operating mode that subtract the start of the duty interval of the operating mode from the duty reference, d. Additional combination modules are provided for the operating modes not illustrated. The circuitry for the first operating mode includes a limiter module 202A that receives the value of the duty, reference, d, and limits its value to $$\frac{1}{N-1}.$$

A condition module 203A for the first operating mode outputs a "1" if the duty reference, d, is less than or equal to $$\frac{1}{N-1}$$

and a "0" if the duty reference, d, is greater than $$\frac{1}{N-1}.$$

A combination module 204A, such as a multiplier, receives the outputs from the limiter module 202A and the condition module 203A and outputs the conditioned duty reference for the first mode, $d_{cnd1}$.

The circuitry for each operating mode other than the first mode includes a limiter module 202B, 202C, 202D that receives the interval adjusted duty reference from the associated combination modules 201B, 201C, 201D and limit the value of the interval adjusted duty reference to a range of 0 to $$\frac{1}{N-1}.$$

For a given duty cycle, only one of the limiter modules 202B, 202C, 202D is not saturated. The limiter modules 202B, 202C, 202D corresponding to the interval in which the duty reference, d, falls outputs a value from 0 to $$\frac{1}{N-1},$$

the limiter modules 202B, 202C, 202D for the operating modes having the duty reference, d, less than $$\frac{1}{N-1}, \frac{2}{N-1}, \frac{N-2}{N-1}$$

respectively are limited at 0, the limiter modules 202B, 202C, 202D for the operating modes having the duty reference, d, greater than $$\frac{1}{N-1}, \frac{2}{N-1}, \frac{N-2}{N-1}$$

respectively are limited at $$\frac{1}{N-1}.$$

Condition units 203B, 203C, 203D for each operating mode output a "1" if the output of the associated limiter module 202B, 202C, 202D is greater than 0 and a "0" otherwise. Combination modules 204B, 204C, 204D, such as multipliers, multiply the output of the condition units 203B, 203C, 203D by $$\frac{1}{N-1}.$$

Combination modules 205B, 205C, 205D subtract the outputs from the limiter module 202B, 202C, 202D from the outputs of the combination modules 204B, 204C, 204D to generate a conditioned duty reference for the each operating mode, $d_{cnd2}$, $d_{cnd3}$, $d_{cnd3}$, ..., $d_{cndN}$. A combination module 206, such as an adder, adds the conditioned duty reference for the each operating mode, $d_{cnd1}$, $d_{cnd2}$, $d_{cnd3}$, $d_{cnd3}$, ..., $d_{cndN}$ to generate the conditioned duty reference, $d_{cond}$.

Figure 5:
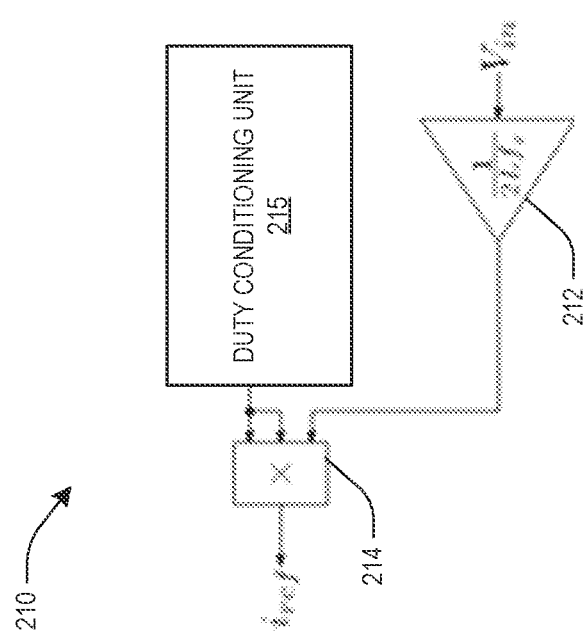
FIG. 5 is a block diagram of a reference signal generator for multi-level power converter is provided, in accordance with some embodiments.

Referring to FIG. 5, a block diagram of a reference signal generator 210 for generating the reference current parameter, $i_{ref}$ for a multi-level power converter 110 is provided, in accordance with some embodiments. The reference signal generator 210 comprises a gain unit 212 that multiplies the input voltage, $V_{in}$, by a gain factor to generate an input current parameter and a combination module 214 that multiplies the input current parameter by a square of a nominal conditioned duty value calculated by a duty conditioning unit 215 based on the nominal operating point duty value D to generate the reference current parameter, $i_{ref}$. The duty conditioning unit 215 employs the same circuitry or calculations as the duty conditioning unit 188 shown in FIG. 4, but uses the nominal operating point duty value D specified as a design parameter of the multi-level power converter 110 as opposed to the duty reference, d. The gain of the gain unit 212 is $$\frac{1}{2Lf_s},$$

where L is the inductance value of the inductor 137 and $f_s$ is the switching frequency of the multi-level power converter 110. Other structures and configurations of the reference signal generator 210 are within the scope of the present disclosure.

Figure 6:
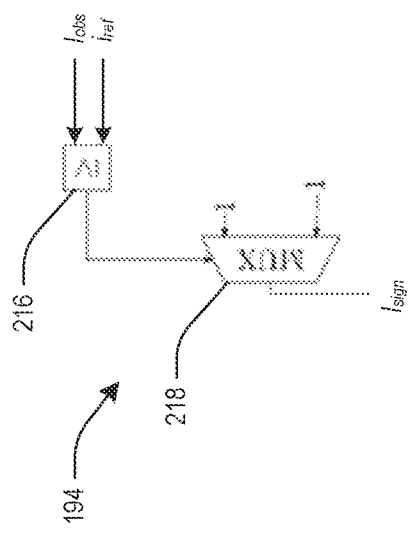
FIG. 6 is a block diagram of a load current error conditioning block, in accordance with some embodiments.

Referring to FIG. 6, a block diagram of the load current error conditioning block 194 is provided, in accordance with some embodiments. The load current error conditioning block 194 comprises a comparator module 216 and a multiplexer 218. The comparator module 216 compares the value of the flying capacitor current parameter, $I_{obs}$, to the reference current parameter, $i_{ref}$. If $I_{obs} \geq i_{ref}$, the comparator module 216 generates a select signal for the multiplexer 218 having a first logic state, and, if $I_{obs} < i_{ref}$, the comparator module 216 generates the select signal having a second logic state. In some embodiments, the comparator module 216 subtracts the reference current parameter, $i_{ref}$ from the flying capacitor current parameter, $I_{obs}$, to determine a current error signal and determines the sign correction signal based on a sign of the current error signal. The multiplexer 218 selects between a first input having a value of "1" and a second input having a value of "−1" based on the select signal to generate the sign correction signal, $I_{Sign}$. Other structures and configurations of the load current error conditioning block 194 are within the scope of the present disclosure.

Figure 7:
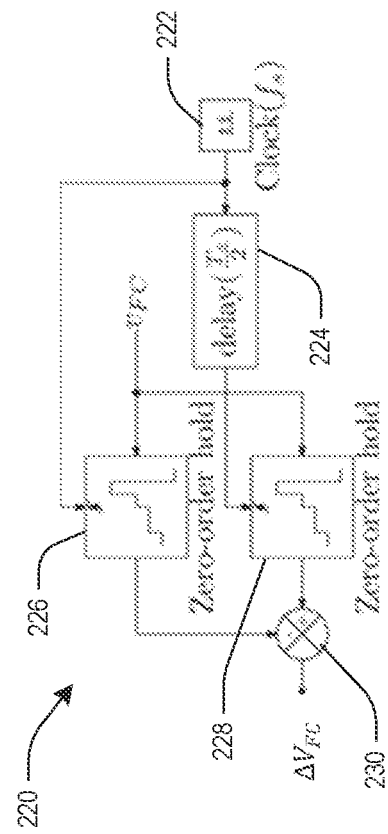
FIG. 7 is a block diagram of a ripple voltage sensing component, in accordance with some embodiments.

Referring to FIG. 7, a block diagram of a ripple voltage sensing component 220 for generating the flying capacitor ripple voltage, $\Delta V_{FC}$, is provided, in accordance with some embodiments. In some embodiments, the ripple voltage sensing component 220 comprises a clock module 222, a delay module 224, zero-order hold modules 226, 228, and a combination module 230. The clock module 222 generates a clock signal based on the switching frequency, $f_s$, and the delay module 224 delays the clock signal by one half the switching interval, $T_s$, corresponding to the switching frequency, $f_s$. The zero-order hold modules 226, 228 receive the flying capacitor voltage, $V_{FC}$, of a selected flying capacitor, such $C_{fly1}$ 122. The zero-order hold module 226 received the clock signal and the zero-order hold modules 228 receives the delayed clock signal. The zero-order hold modules 226, 228 sample the flying capacitor voltage, $V_{FC}$, twice each switching cycle, where the samples are $T_s/2$ apart from the other. The combination module 230 subtracts the sample taken by the zero-order hold module 226 from the sample taken by the zero-order hold module 228 to generate the flying capacitor ripple voltage, $\Delta V_{FC}$. Other structures and configurations of the ripple voltage sensing component 220 are within the scope of the present disclosure.

Figure 8:
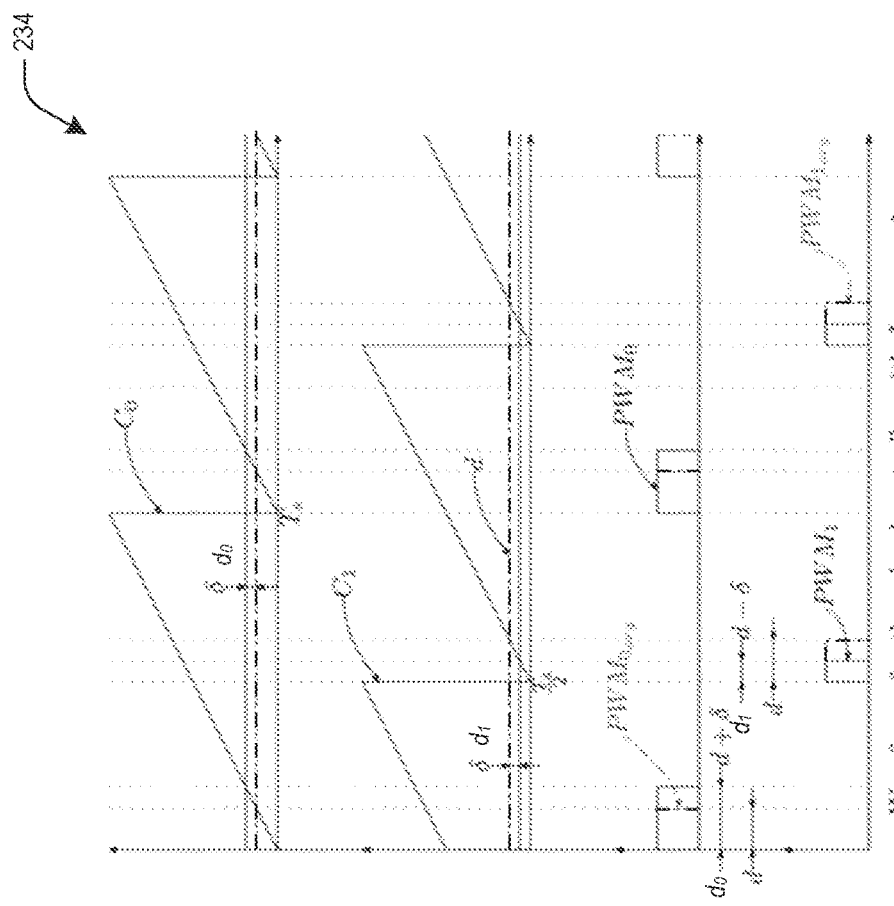
FIG. 8 illustrates timing diagrams showing example carrier signals and PWM signals, in accordance with some embodiments.
Figure 8:
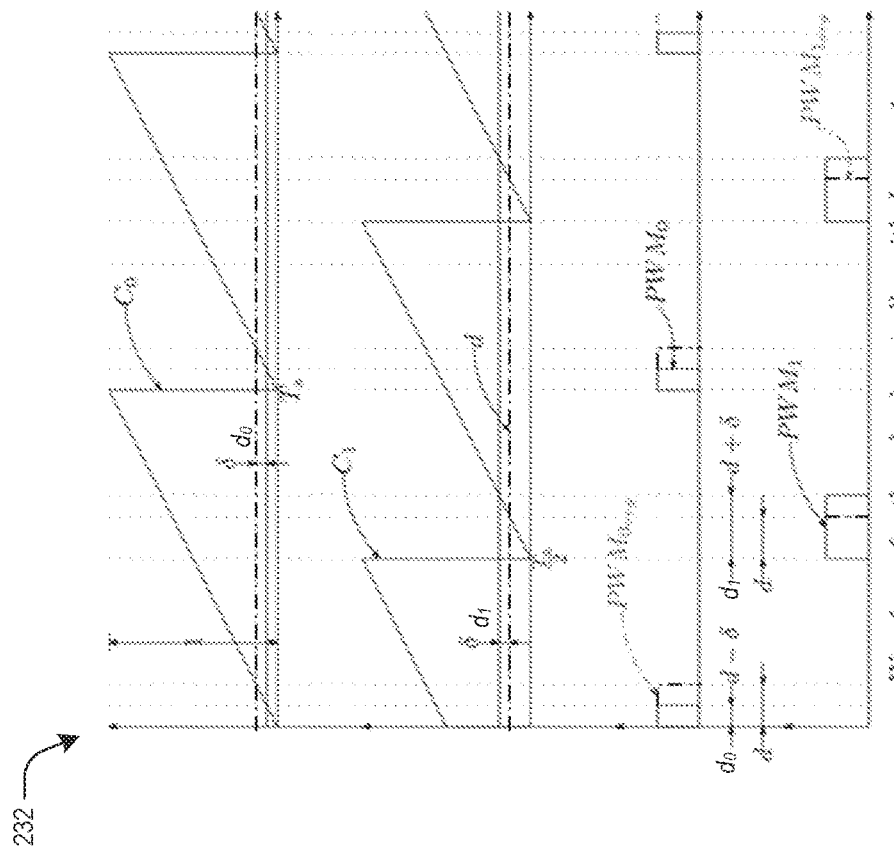

Referring to FIG. 8 timing diagrams 232, 234 showing example carrier signals and PWM signals are provided, in accordance with some embodiments. In some embodiments, carrier signals, $C_0$, $C_1$ used by the PWM generators 164, 166 and the PWM signals, $PMW_0$, $PWM_1$, generated by the PWM generators 164, 166 for a multi-level power converter 110 having three levels are shown. The timing diagram 232 illustrates the case where the sign correction signal, $I_{Sign}$, has a value of "1" and the timing diagram 234 illustrates the case where the sign correction signal, $I_{Sign}$, has a value of "−1". The signals $PMW_{0org}$, $PWM_{1org}$ represent PWM signals generated based on the duty reference, d, without modification by the duty correction factors, $\delta_0$ $\delta_1$, respectively.

In the timing diagram 232, where the sign correction signal, $I_{Sign}$, has a value of "1", the duty correction factor, $\delta_1$, is added to the duty reference, d, to generate the duty command, $d_1$, and subtracted from the duty reference, d, to generate the duty command, $d_0$. In the timing diagram 234, where the sign correction signal, $I_{Sign}$, has a value of "−1", the duty correction factor, $\delta_1$, is subtracted from the duty reference, d, to generate the duty command, $d_1$, and added to the duty reference, d, to generate the duty command, $d_0$.

Figure 9:
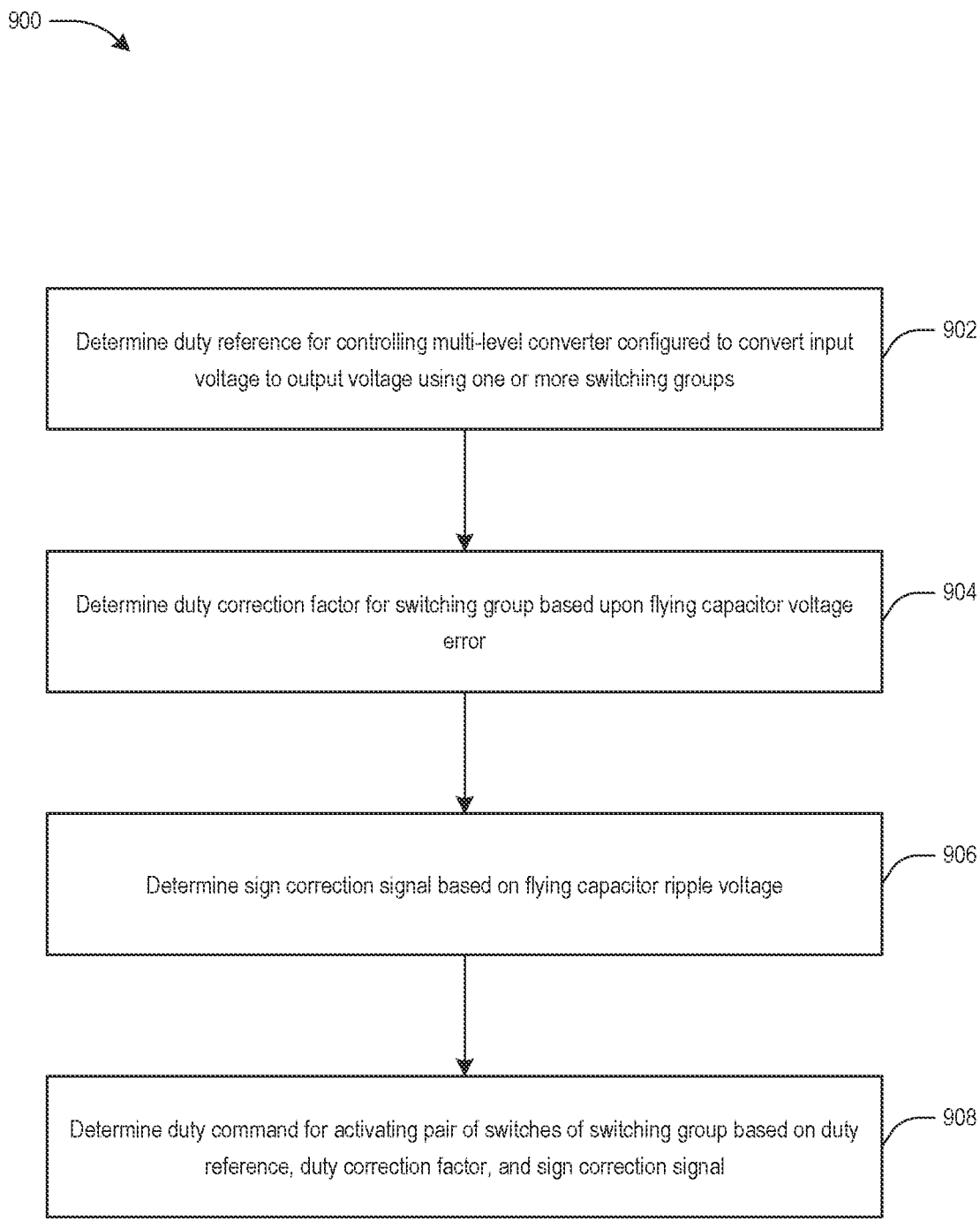
FIG. 9 illustrates a method for controlling a power converter apparatus, in accordance with some embodiments.

FIG. 9 illustrates a method 900 for controlling a power converter apparatus 100, in accordance with some embodiments. At 902 a duty reference is determined for controlling a multi-level power converter 110 configured to convert an input voltage to an output voltage using one or more switching groups. A switching group of the one or more switching groups comprises a pair of switches and a flying capacitor. At 904, a duty correction factor is determined for the switching group based upon a flying capacitor voltage error. At 906, a sign correction signal is determined based on a flying capacitor ripple voltage. At 908, a duty command for activating the pair of switches of the switching group is determined based on the duty reference, the duty correction factor, and the sign correction signal.

Figure 10:
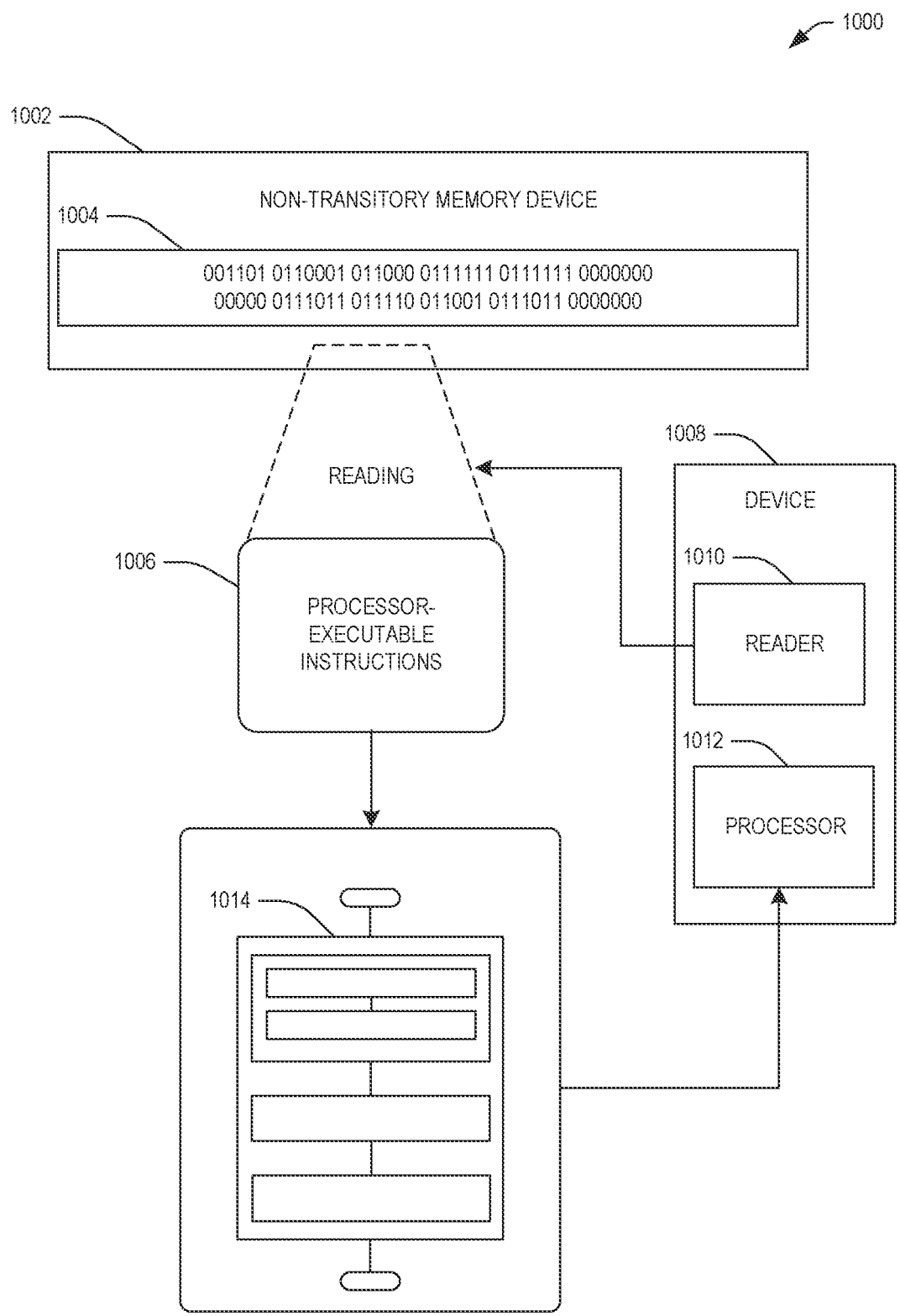
FIG. 10 illustrates an exemplary embodiment of a computer-readable medium, in accordance with some embodiments.

FIG. 10 illustrates an exemplary embodiment 1000 of a computer-readable medium 1002, in accordance with some embodiments. One or more embodiments involve a computer-readable medium comprising processor-executable instructions configured to implement one or more of the techniques presented herein. The embodiment 1000 comprises a non-transitory computer-readable medium 1002 (e.g., a CD-R, DVD-R, flash drive, a platter of a hard disk drive, etc.), on which is encoded computer-readable data 1004. This computer-readable data 1004 in turn comprises a set of processor-executable computer instructions 1006 that, when executed by a computing device 1008 including a reader 1010 for reading the processor-executable computer instructions 1006 and a processor 1012 for executing the processor-executable computer instructions 1006, are configured to facilitate operations according to one or more of the principles set forth herein. In some embodiments, the processor-executable computer instructions 1006, when executed, are configured to facilitate performance of a method 1014, such as at least some of the aforementioned method(s). In some embodiments, the processor-executable computer instructions 1006, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, an apparatus comprises a multi-level power converter configured to convert an input voltage to an output voltage, wherein the multi-level power converter comprises one or more switching groups, wherein a switching group of the one or more switching groups comprises a pair of switches and a flying capacitor, and a controller configured to determine a duty reference for the switching group, determine a duty correction factor for the switching group based upon a flying capacitor voltage error of the flying capacitor, determine a sign correction signal based on a flying capacitor ripple voltage, and determine a duty command for activating the pair of switches based on the duty reference, the duty correction factor, and the sign correction signal.

According to some embodiments, the controller is configured to sample a flying capacitor voltage on a selected flying capacitor of a selected switching group of the one or more switching groups over a portion of a switching interval, and subtract a maximum value of the flying capacitor voltage from a minimum value of the flying capacitor voltage to determine the flying capacitor ripple voltage.

According to some embodiments, the controller is configured to determine a gain factor based on a capacitance of a selected flying capacitor of a selected switching group of the one or more switching groups and a switching frequency, multiply the flying capacitor ripple voltage by the gain factor and a conditioned duty reference to determine a flying capacitor current parameter, and determine the sign correction signal based on the flying capacitor current parameter and a reference current parameter.

According to some embodiments, the multi-level power converter comprises N levels and N−1 operating modes, and the controller is configured to determine a duty interval for each of the operating modes and determine the conditioned duty reference by determining a selected duty interval that includes the duty reference and setting the value of the conditioned duty reference to a value between zero and 1/(N−1) within the selected duty interval.

According to some embodiments, the multi-level power converter comprises an inductor connected to the one or more switching groups, and the controller is configured to determine the reference current parameter by dividing the input voltage by a product of twice an inductance value of the inductor and the switching frequency to generate a parameter and multiplying the parameter by a square of a nominal conditioned duty value.

According to some embodiments, the controller is configured to determine the sign correction signal by subtracting the reference current parameter from the flying capacitor current parameter to determine a current error signal, and determining the sign correction signal based on a sign of the current error signal.

According to some embodiments, the controller is configured to generate the duty command by adjusting at least one of a duty cycle or a carrier signal slope based on the duty reference, the sign correction signal, and the duty correction factor.

According to some embodiments, an apparatus comprises a multi-level power converter configured to convert an input voltage to an output voltage, wherein the multi-level power converter comprises one or more switching groups, wherein a switching group of the one or more switching groups comprises a pair of switches and a flying capacitor, a first controller configured to determine a duty reference for the switching group, a sign correction component configured to determine a sign correction signal based on a flying capacitor ripple voltage, one or more balancing controllers configured to determine duty correction factors for the one or more switching groups based upon a flying capacitor voltage error of the flying capacitor for the switching group, and a duty generation component configured to generate a duty commands for activating the pair of switches of the switching group based on the duty reference, the sign correction signal, and the duty correction factor.

According to some embodiments, the sign correction component comprises a sensing component configured to sample a flying capacitor voltage on a selected flying capacitor of a selected switching group of the one or more switching groups over a portion of a switching interval, and subtract a minimum value of the flying capacitor voltage from a maximum value of the flying capacitor voltage to determine the flying capacitor ripple voltage.

According to some embodiments, the sign correction component is configured to determine a gain factor based on a capacitance of a selected flying capacitor of a selected switching group of the one or more switching groups and a switching frequency, divide a product of the flying capacitor ripple voltage and the gain factor by a conditioned duty reference to determine a flying capacitor current parameter, determine a reference current parameter based on the input voltage, and determine the sign correction signal based on the flying capacitor current parameter and the reference current parameter.

According to some embodiments, the multi-level power converter comprises N levels and N−1 operating modes, and the duty conditioning component is configured to determine a duty interval for each of the operating modes and determine the conditioned duty reference by determining a selected duty interval that includes the duty reference and setting the value of the conditioned duty reference to a value between zero and 1/(N−1) within the selected duty interval.

According to some embodiments, the multi-level power converter comprises an inductor connected to the one or more switching groups, and the sign correction component is configured to determine the reference current parameter by dividing the input voltage by a product of twice an inductance value of the inductor and the switching frequency to generate a parameter and multiplying the parameter by a square of a nominal conditioned duty value.

According to some embodiments, the sign correction component is configured to determine the sign correction signal by subtracting the reference current parameter from the flying capacitor current parameter to determine a current error signal, and determine the sign correction signal based on a sign of the current error signal.

According to some embodiments, the duty generation component is configured to generate the duty command by adjusting at least one of a duty cycle or a carrier signal slope based on the duty reference, the sign correction signal, and the duty correction factor.

According to some embodiments, a system comprises means for determining a duty reference for controlling a multi-level power converter configured to convert an input voltage to an output voltage using one or more switching groups, wherein a switching group of the one or more switching groups comprises a pair of switches and a flying capacitor, means for determining a duty correction factor for the switching group based upon a flying capacitor voltage error, means for determining a sign correction signal based on a flying capacitor ripple voltage, and means for determining a duty command for activating the pair of switches of the switching group based on the duty reference, the duty correction factor, and the sign correction signal.

According to some embodiments, a method comprises determining a duty reference for controlling a multi-level power converter configured to convert an input voltage to an output voltage using one or more switching groups, wherein a switching group of the one or more switching groups comprises a pair of switches and a flying capacitor, determining a duty correction factor for the switching group based upon a flying capacitor voltage error, determining a sign correction signal based on a flying capacitor ripple voltage, and determining a duty command for activating the pair of switches of the switching group based on the duty reference, the duty correction factor, and the sign correction signal.

According to some embodiments, the method comprises sampling a flying capacitor voltage on a selected flying capacitor of a selected switching group of the one or more switching groups over a portion of a switching interval, and determining an absolute difference between a minimum value of the flying capacitor voltage and a maximum value of the flying capacitor voltage to determine the flying capacitor ripple voltage.

According to some embodiments, the method comprises determining a gain factor based on a capacitance of a selected flying capacitor of a selected switching group of the one or more switching groups and a switching frequency, dividing a product of the flying capacitor ripple voltage by and the gain factor by a conditioned duty reference to determine a flying capacitor current parameter, determining a reference current parameter based on the input voltage, and determining the sign correction signal based on the flying capacitor current parameter and the reference current parameter.

According to some embodiments, the multi-level power converter comprises N levels and N−1 operating modes, and the method comprises determining a duty interval for each of the operating modes, and determining the conditioned duty reference by determining a selected duty interval that includes the duty reference and setting the value of the conditioned duty reference to a value between zero and 1/(N−1) within the selected duty interval.

According to some embodiments, determining the reference current parameter comprises generating a parameter by dividing the input voltage by a product of twice an inductance value of an inductor of the multi-level power converter connected to the switching groups and the switching frequency to determine the reference current parameter, and multiplying the parameter by a square of a nominal conditioned duty value.

According to some embodiments, determining the sign correction signal comprises subtracting the reference current parameter from the flying capacitor current parameter to determine a current error signal, and determining the sign correction signal based on a sign of the current error signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus comprising:
    a multi-level power converter configured to convert an input voltage to an output voltage, wherein the multi-level power converter comprises one or more switching groups, wherein a switching group of the one or more switching groups comprises a pair of switches and a flying capacitor; and
    a controller configured to determine a duty reference for the switching group, determine a duty correction factor for the switching group based upon a flying capacitor voltage error of the flying capacitor, determine a sign correction signal based on a flying capacitor ripple voltage, and determine a duty command for activating the pair of switches based on the duty reference, the duty correction factor, and the sign correction signal.

2. The apparatus of claim 1, wherein the controller is configured to:
    sample a flying capacitor voltage on a selected flying capacitor of a selected switching group of the one or more switching groups over a portion of a switching interval; and
    subtract a maximum value of the flying capacitor voltage from a minimum value of the flying capacitor voltage to determine the flying capacitor ripple voltage.

3. The apparatus of claim 1, wherein the controller is configured to:
    determine a gain factor based on a capacitance of a selected flying capacitor of a selected switching group of the one or more switching groups and a switching frequency;
    multiply the flying capacitor ripple voltage by the gain factor and a conditioned duty reference to determine a flying capacitor current parameter; and
    determine the sign correction signal based on the flying capacitor current parameter and a reference current parameter.

4. The apparatus of claim 3, wherein:
    the multi-level power converter comprises N levels and N−1 operating modes; and
    the controller is configured to determine a duty interval for each of the operating modes and determine the conditioned duty reference by determining a selected duty interval that includes the duty reference and setting the value of the conditioned duty reference to a value between zero and $$\frac{1}{N-1}$$

within the selected duty interval.

5. The apparatus of claim 3, wherein:
    the multi-level power converter comprises an inductor connected to the one or more switching groups; and
    the controller is configured to determine the reference current parameter by dividing the input voltage by a product of twice an inductance value of the inductor and the switching frequency to generate a parameter and multiplying the parameter by a square of a nominal conditioned duty value.

6. The apparatus of claim 3, wherein the controller is configured to determine the sign correction signal by:
    subtracting the reference current parameter from the flying capacitor current parameter to determine a current error signal; and
    determining the sign correction signal based on a sign of the current error signal.

7. The apparatus of claim 1, wherein the controller is configured to generate the duty command by adjusting at least one of a duty cycle or a carrier signal slope based on the duty reference, the sign correction signal, and the duty correction factor.

8. An apparatus, comprising:
    a multi-level power converter configured to convert an input voltage to an output voltage, wherein the multi-level power converter comprises one or more switching groups, wherein a switching group of the one or more switching groups comprises a pair of switches and a flying capacitor;

a first controller configured to determine a duty reference for the switching group;

a sign correction component configured to determine a sign correction signal based on a flying capacitor ripple voltage;

one or more balancing controllers configured to determine duty correction factors for the one or more switching groups based upon a flying capacitor voltage error of the flying capacitor for the switching group; and a duty generation component configured to generate a duty command for activating the pair of switches of the switching group based on the duty reference, the sign correction signal, and the duty correction factor.

9. The apparatus of claim 8, wherein the sign correction component comprises a sensing component configured to:

sample a flying capacitor voltage on a selected flying capacitor of a selected switching group of the one or more switching groups over a portion of a switching interval; and subtract a minimum value of the flying capacitor voltage from a maximum value of the flying capacitor voltage to determine the flying capacitor ripple voltage.

10. The apparatus of claim 8, wherein the sign correction component is configured to:

determine a gain factor based on a capacitance of a selected flying capacitor of a selected switching group of the one or more switching groups and a switching frequency;

divide a product of the flying capacitor ripple voltage and the gain factor by a conditioned duty reference to determine a flying capacitor current parameter;

determine a reference current parameter based on the input voltage; and determine the sign correction signal based on the flying capacitor current parameter and the reference current parameter.

11. The apparatus of claim 10, wherein:

the multi-level power converter comprises N levels and N−1 operating modes; and the duty conditioning component is configured to determine a duty interval for each of the operating modes and determine the conditioned duty reference by determining a selected duty interval that includes the duty reference and setting the value of the conditioned duty reference to a value between zero and $$\frac{1}{N-1}$$

within the selected duty interval.

12. The apparatus of claim 10, wherein:

the multi-level power converter comprises an inductor connected to the one or more switching groups; and the sign correction component is configured to determine the reference current parameter by dividing the input voltage by a product of twice an inductance value of the inductor and the switching frequency to generate a parameter and multiplying the parameter by a square of a nominal conditioned duty value.

13. The apparatus of claim 10, wherein the sign correction component is configured to determine the sign correction signal by:

subtracting the reference current parameter from the flying capacitor current parameter to determine a current error signal; and determine the sign correction signal based on a sign of the current error signal.

14. The apparatus of claim 8, wherein the duty generation component is configured to generate the duty command by adjusting at least one of a duty cycle or a carrier signal slope based on the duty reference, the sign correction signal, and the duty correction factor.

15. A method comprising:

determining a duty reference for controlling a multi-level power converter configured to convert an input voltage to an output voltage using one or more switching groups, wherein a switching group of the one or more switching groups comprises a pair of switches and a flying capacitor;

determining a duty correction factor for the switching group based upon a flying capacitor voltage error;

determining a sign correction signal based on a flying capacitor ripple voltage; and determining a duty command for activating the pair of switches of the switching group based on the duty reference, the duty correction factor, and the sign correction signal.

16. The method of claim 15, comprising:

sampling a flying capacitor voltage on a selected flying capacitor of a selected switching group of the one or more switching groups over a portion of a switching interval; and determining an absolute difference between a minimum value of the flying capacitor voltage and a maximum value of the flying capacitor voltage to determine the flying capacitor ripple voltage.

17. The method of claim 15, comprising:

determining a gain factor based on a capacitance of a selected flying capacitor of a selected switching group of the one or more switching groups and a switching frequency;

dividing a product of the flying capacitor ripple voltage and the gain factor by a conditioned duty reference to determine a flying capacitor current parameter;

determining a reference current parameter based on the input voltage; and determining the sign correction signal based on the flying capacitor current parameter and the reference current parameter.

18. The method of claim 17, wherein:

the multi-level power converter comprises N levels and N−1 operating modes; and the method comprises:

determining a duty interval for each of the operating modes; and determining the conditioned duty reference by determining a selected duty interval that includes the duty reference and setting the value of the conditioned duty reference to a value between zero and $$\frac{1}{N-1}$$

within the selected duty interval.

19. The method of claim 17, wherein determining the reference current parameter comprises:

generating a parameter by dividing the input voltage by a product of twice an inductance value of an inductor of the multi-level power converter connected to the switching groups and the switching frequency to determine the reference current parameter; and multiplying the parameter by a square of a nominal conditioned duty value.

20. The method of claim 17, wherein determining the sign correction signal comprises:

subtracting the reference current parameter from the flying capacitor current parameter to determine a current error signal; and determining the sign correction signal based on a sign of the current error signal.

* * * * *